(12) United States Patent
Kovacevic et al.

(10) Patent No.: US 6,301,222 B1
(45) Date of Patent: Oct. 9, 2001

(54) SIGNAL DATA TRANSMISSION OVER LOSSY PACKET NETWORKS

(75) Inventors: Jelena Kovacevic, New York, NY (US); Francis Man Lung Ng, Milpitas, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/957,117

(22) Filed: Oct. 24, 1997

(51) Int. Cl.$^7$ ..................................... H04L 12/28
(52) U.S. Cl. ............................ 370/216; 382/252
(58) Field of Search ..................... 375/241, 242, 375/229; 370/537, 538, 540, 541, 216; 704/258, 269, 220, 204; 382/248, 249, 250, 263, 264, 240, 252

(56) References Cited

U.S. PATENT DOCUMENTS

| | | | |
|---|---|---|---|
| 4,974,187 | * 11/1990 | Lawton | 364/728.1 |
| 5,222,080 | * 6/1993 | Wang et al. | 375/241 |
| 5,434,567 | * 7/1995 | Mack et al. | 341/50 |
| 5,754,702 | * 5/1998 | Simpson | 382/240 |

OTHER PUBLICATIONS

A.A. El Gamal and T.M. Cover, "Achievable Rates for Multiple Descriptions," IEEE Trans. Inform. Th., 28(6):851–857, Nov. 1982.
V.A. Vaishampayan, "Design of Multiple Description Scalar Ouantizers," IEEE Trans. Inform. Th., 39(3):821–834, May 1993.
P. Subrahmanya and T. Berger, "Multiple Descriptions Encoding of Images," Preprint, 1997.
Y. Wang, M.T. Orchard and A.R. Reibman, "Multiple Description Image Coding for Noisy Channels by Pairing Transform Coefficients," Proc. First IEEE SP Workshop on Multimedia Signal Processing, pp. 419–424, Princeton, NJ, Jun. 1997.
J.M. Danskin, G.M. Davis and X. Song, "Fast Lossy Internet Image Transmission," ACM Multimedia, San Francisco, CA, Nov. 1995.
L.–H. Tsai, "An Algorithm for Flow Time Minimization and its Asymptotic Makespan Properties," Information Processing Letters, 43:41–46, 1992.

(List continued on next page.)

Primary Examiner—Wellington Chin
Assistant Examiner—Frank Duong
(74) Attorney, Agent, or Firm—Ryan, Mason & Lewis, LLP

(57) ABSTRACT

A signal transmission system assigns portions of an image or other type of signal to packets so as to provide an approximate equalization of the signal energy across the packets. As a result, the quality of a reconstructed signal in the presence of a given amount of packet loss is substantially the same regardless of the particular packets which are lost. In one possible implementation, the signal is separated into subbands using a cosine-modulated orthonormal filter bank. The subbands are then assigned to packets in accordance with an energy equalization algorithm such that the cumulative energies of the packets are approximately equal. In another implementation, an image signal is scrambled such that pixels in the image are mapped to different spatial positions, thereby producing a whitened image. The whitened image is then separated into subbands, and the subbands are assigned deterministically to the packets. Similar whitening techniques can be also used with non-image signals. These and other implementations of the invention provide graceful degradation in reconstructed signal quality in the presence of packet loss during transmission.

33 Claims, 2 Drawing Sheets

OTHER PUBLICATIONS

J. Kovacevic, D.J. Legal and M. Vetterli, "Image Coding with Widowed Modulated Filter Banks." Proc. IEEE Int. Conf. Acoust., Speech and Signal Proc., pp. 1949–1952, Glasgow, UK, May 1989.

G. Karlsson and M. Vetterli, "Subband Coding of Video Signals for Packet–Switched Networks," Proc. IEEE Int. Conf. Acoust., Speech, and Signal Proc., New York, NY, Apr. 1988.

Kodak FlashPix Specification and Interoperability Test Suite, http://www.kodak.com/US/en/deg/productstechnologies/Fpx/FlashPixSpecDesc.html, pp. 1–4, 1997.

* cited by examiner

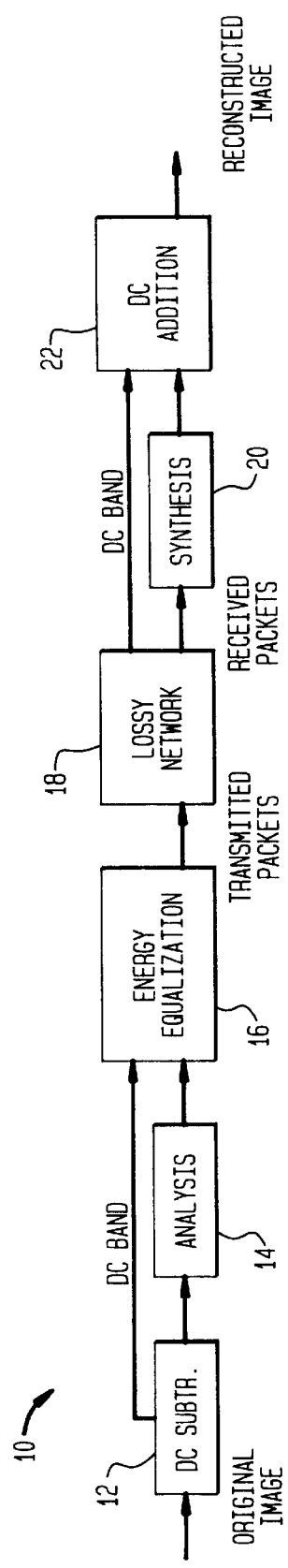
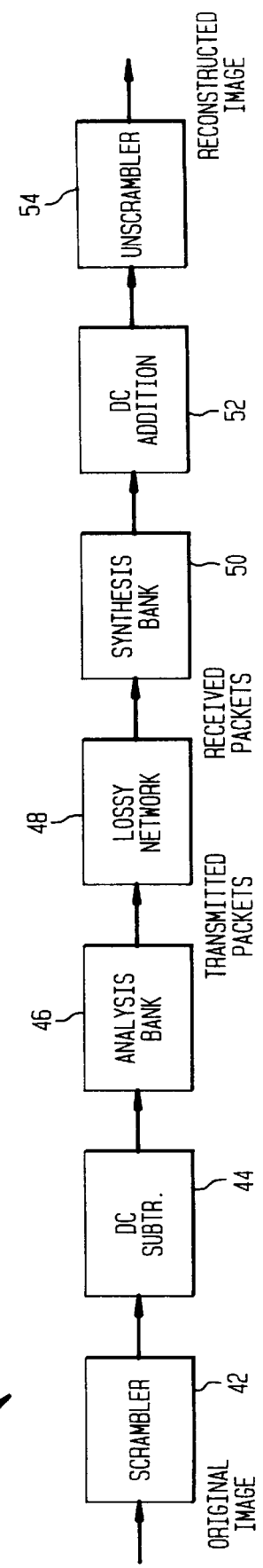

SIGNAL DATA TRANSMISSION OVER LOSSY PACKET NETWORKS

FIELD OF THE INVENTION

The present invention relates generally to the transmission of image data and other types of signal data, and more particularly to techniques for transmitting data over lossy packet networks such that the impact of packet loss on reconstructed signal quality is minimized.

BACKGROUND OF THE INVENTION

In many data transmission applications, it is common for data to "hop" over network links of different capacities. For example, a typical scenario might involve a high-capacity network link switching over to a wireless link. Networks in which such hopping occurs are generally referred to as heterogenous networks. In heterogenous networks, packets may have to be dropped to accommodate a hop to a lower-capacity link. Packets could also be lost in the network due to transmission errors or congestions. If packet retransmission is not a viable option, due to real-time transmission constraints or other limitations, it is still important to provide the receiver with the most meaningful information possible despite the packet loss.

For applications in which image data is transmitted, a conventional approach to alleviating the packet loss problem is to send the images in a layered, multiresolution manner. This approach separates the data into parts of unequal importance. Packets are then labeled with an indication of the priority of the data contained therein. Thus, in a scenario in which a packet needs to be dropped, a network control mechanism may be used to discard the lowest priority packets first. At the receiver, the image is reconstructed from the high-priority essential information carried in packets which were labeled as such and therefore not dropped. A similar technique used in video data transmission is described in G. Karlsson and M. Vetterli, "Three-Dimensional Subband Coding of Video," Proc. IEEE Int. Conf. Acoust., Speech and Signal Proc., pp. 1100–1103, New York, N.Y., April 1988. Although this technique does not require the introduction of additional data, it does require the additional complexity of examining the contents of each packet to determine priority. In addition, it is generally not applicable to transmission over the Internet, which is based on the Internet Protocol (IP) and does not provide priority, levels, and transmission over broadband networks based on asynchronous transfer mode (ATM), which can accommodate only two priority levels. These and other important networks may therefore require packet retransmission, redundant packet transmission or other inefficient techniques in order to ensure a desired quality level for the image reconstructed at the receiver.

SUMMARY OF THE INVENTION

The invention provides improved techniques for transmitting data in the presence of packet loss, without substantially increasing the processing overhead or the amount of data that must be sent. The techniques are suitable for use in conjunction with data transmission over a wide variety of lossy packet networks, including the Internet and broadband ATM networks, and may be used with raw or compressed image data, as well as video, audio and other types of data. The invention generally represents signal data in such a way that, when separated into packets, all packets are of approximately the same importance. As a result, when packets are randomly lost in a lossy packet network, the resulting degradation in the reconstructed signal is substantially uniform regardless of which packets are lost.

In an illustrative embodiment of the invention, a signal transmission system assigns portions of an image signal to packets such that each of the packets has an approximately equal cumulative image signal energy, and then transmits the packets over the network. In one possible implementation, the image is separated into subbands using a cosine-modulated orthonormal filter bank. An energy equalization algorithm is then used to assign the subbands to the packets such that the cumulative image signal energies of the packets are approximately equal. A DC band of the image may be separated from the remainder of the image, and inserted into each of the packets. A given packet also includes labels identifying each of the subbands in that packet, such that a receiver can direct the appropriate subbands to corresponding channels of a synthesis filter bank.

Another possible implementation of the transmission system includes a scrambler for scrambling the image such that pixels in the image are mapped to different spatial positions. This produces a whitened image which is subsequently separated into subbands. The use of the whitened image allows the subbands to be assigned deterministically to the packets. Each packet therefore need only include one label identifying which portion of the scrambled image it contains. The packets may also include an overall brightness indicator derived from a DC band of the scrambled image. A receiver uses the overall brightness indicator to scale a pre-set scrambled low-pass image, and adds the scaled low-pass scrambled image to an output of a synthesis filter bank which recombines the subbands of the scrambled image. The recombined scrambled image is then unscrambled to reconstruct the original image. Both of the above-described illustrative implementations provide graceful degradation in reconstructed image quality in the presence of packet loss. Alternative embodiments may be configured to process video, audio, speech and other types of data.

BRIEF DESCRIPTION OF THE DRAWINGS

FIG. 1 shows an image transmission system in accordance with an exemplary embodiment of the invention in which an energy equalization technique is used to distribute image data to packets for transmission.

FIG. 4 shows an image transmission system in accordance with another exemplary embodiment of the invention in which image scrambling is used to provide energy equalization for image data packets.

DETAILED DESCRIPTION OF THE INVENTION

Figure 2:
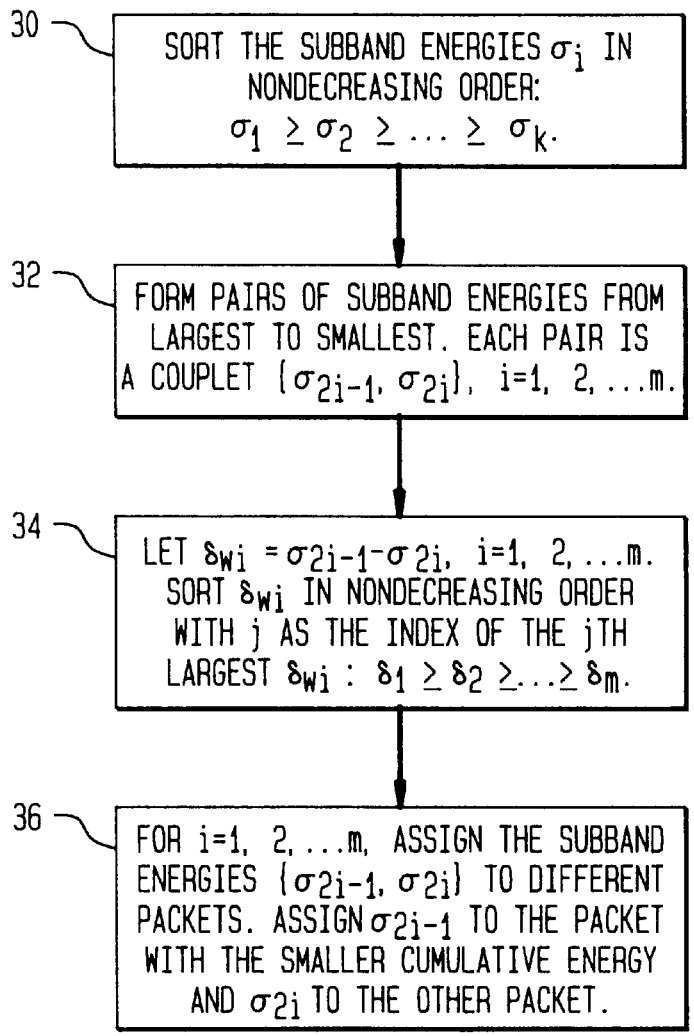
FIG. 2 is a flow diagram illustrating an exemplary energy equalization algorithm for use in the image transmission system of FIG. 1.

The invention will be illustrated below in conjunction with exemplary image transmission systems. Although particularly well suited for use in transmitting uncompressed or "raw" image data, the techniques described may also be applied to transmission of compressed image data as well as to the transmission of a wide variety of other types of data, including audio, video and speech data in compressed or uncompressed form. In addition, the invention provides a solution to the general problem of holographic image representation. The term "energy equalization" as used herein is intended to include approximate equalization of cumulative signal energy across a set of packets. The term "packet" is intended to include any group or set of image data suitable for transmission as a unit over a network.

In accordance with the invention, an image to be transmitted is represented in such a way that, when separated into packets, all packets are of approximately the same importance. As a result, when packets are randomly dropped in a lossy network, the resulting degradation in the reconstructed image is uniform regardless of which packets are dropped. This avoids the processing overhead associated with including a priority indicator in each packet, and does not require that substantial amounts of redundant information be sent.

Let $f$ be an image sequence which can be symbolically decomposed into n components $f_i$, $$f = \sum_{i=1}^{n} f_i, \quad (1)$$

where each $f_i$ is put into a packet and transmitted. It will be assumed for simplicity of illustration that each packet has an equal probability of being dropped in the network. As noted above, the invention ensures that each packet carries equally important information. In other words, the error between any of the $f_i$ and the image $f$ itself should be substantially the same. Therefore, the first criterion for selecting the $f_i$ may be expressed as:

$$\|f - f_i\|^2 = \|f - f_j\|^2, \quad (2)$$

for all i, j. The image sequence $f$ may be decomposed into its $f$ components using critically-sampled, cosine-modulated, fast-implementation orthonormal filter banks, as described in greater detail in M. Vetterli and J. Kovacevic, "Wavelets and Subband Coding," Signal Processing, Prentice-Hall, Englewood Cliffs, N.J., 1995, which is incorporated by reference herein. These filter banks may be configured to implement orthonormal expansions of a square-summable sequence $f$ where the output of an analysis filter bank gives the coefficients of the signal expansion while the output of the synthesis filter bank gives the $f_i$. Another condition for selecting the $f_i$ may therefore be given by:

$$(f_i, f_j) = 0 \quad (3)$$

for all i, j where i≠j.

From (1) and (2) above, the criterion for equally important $f_i$ means:

$$\|f - f_i\|^2 = \|f - f_j\|^2 \Leftrightarrow \left\|\sum_{k \neq i} f_k\right\|^2 = \left\|\sum_{l \neq j} f_l\right\|^2.$$

However, (3) implies that $$\left\|\sum_{k \neq i} f_k\right\|^2 = \left\|\sum_{l \neq j} f_l\right\|^2 \Leftrightarrow \sum_{k \neq i} \|f_k\|^2 = \sum_{l \neq j} \|f_l\|^2,$$

leading finally to $$\|f - f_i\|^2 = \|f - f_j\|^2 \Leftrightarrow \|f_i\|^2 = \|f_j\|^2.$$

for all i, j. The image components $f_i$ thus need to have equal energy for (2) to hold. The invention uses this criterion for grouping image components into packets. For example, k subbands of the image may be distributed into n packets such that each packet has k/n subbands, providing the same data rate in each packet, and such that the energy of each packet is the same.

FIG. 1 shows an image transmission system 10 in accordance with a first embodiment of the invention that utilizes an equal energy distribution criterion to ensure that each image data packet has approximately the same energy. An original image is applied to a DC subtractor 12 and an analysis filter bank 14. The DC subtractor 12 removes the DC band from the image and applies it directly to an energy equalization device 16. The output of the analysis filter bank 14 is also applied to the energy equalization device 16. Since the DC band usually carries much more energy than the other, higher-frequency subbands, the DC subtractor 12 subtracts the DC band from the other subbands of the image which are applied to the analysis filter bank 14. The DC band is then added to each of the packets in the energy equalization device 16. The energy equalization device 16 also labels the packets so that the receiver can properly channel each subband into the appropriate branch of a synthesis filter bank 20. The DC band addition and packet labeling increase the overhead associated with each packet by a factor of:

$$r_1 = 1 + \frac{n}{k} + \frac{k}{hw},$$

where h, w are the height and width of the image, respectively. The second term in the sum is the overhead due to the DC band added to each packet, while the third term is due to the labeling of packets necessary for proper channeling at the receiving end. The primary source of data increase is due to the second term, and it decreases as the number of subbands k increases or the number of packets n decreases. The overhead due to packet labeling is not very large since this labeling may only involve sending a subband number with each packet.

The analysis filter bank 14 may be implemented as the above-noted critically-sampled orthonormal filter bank configured to implement orthonormal expansions of a square-summable image sequence $f$, such that the output of the analysis filter bank 14 gives the coefficients of the signal expansion. The orthonormal filter bank preferably utilizes cosine-modulated filters because such filters are efficient to implement in that all the filters in the bank can be obtained by modulation of a single prototype filter. Other types of filter banks could be used in place of the cosine-modulated orthonormal filter bank, including under-sampled or over-sampled filter banks. In general, any type of filter bank which will achieve separation of an image into multiple subbands may be used.

The energy equalization device 16 determines how many subbands to use and how many packets to send, and then runs an energy equalization algorithm to assign each subband to one of the n packets. The determination of how many subbands to use may be based on the maximum allowable energy difference, as will be described in greater detail below. The transmitted packets pass through a lossy network 18 to a receiver which processes the received packets such that the DC bands are removed from the received packets and applied directly to a DC addition device 22, while the subbands are applied to the synthesis filter bank 20. The packet labels are used to channel each subband into the proper branch of the synthesis filter bank 20. The output of the DC addition device is a reconstructed image.

As noted above, the energy equalization device 16 in system 10 distributes k subbands from the analysis filter bank 14 into n packets such that the n packets have approximately equal energy. Since the size of each of the n packets should be the same, each of the packets should generally have the same number of subbands, that is, k should be equal to mn. The subband distribution problem may be characterized as distributing k numbers into n bins, each bin having exactly m numbers, and the sums of the numbers in each bin being as close as possible. This distribution problem is known in computer science as a parallel machine scheduling problem which requires the assignment of k tasks to n identical processors so as to minimize the largest task finishing time or "makespan." Parallel machine scheduling problems are described in greater detail in, for example, E. G. Coffman and G. S. Lueker, "Probabilistic Analysis of Packing and Partitioning Algorithms," Wiley, N.Y., 1991, which is incorporated by reference herein.

The constraint that each bin contains the same number of numbers is known as scheduling with cardinality balance, that is, the number of tasks assigned to each processor is either $\lfloor k/n \rfloor$ or $\lceil k/n \rceil$. Exemplary algorithms for scheduling with cardinality balance are described in G. S. Lueker, "A Note on the Average-Case Behavior of a Simple Differencing Method for Partitioning," Operations Research Letters, 6:285–288, 1987, N. Karmarkar and R. M. Karp, "The Differencing Method for Set Partitioning," Technical Report, University of California at Berkeley, Berkeley, Calif., 1982, and E. G. Coffman, G. N. Frederickson and G. S. Lueker, "A Note on Expected Makespans for Largest-First Sequences of Independent Tasks on Two Processors," Math. Oper, Res., 9:260–266, 1984, all of which are incorporated by reference herein. These algorithms generally assume a simple probability distribution function for the processing times. In many image transmission applications, the corresponding distribution function is generally unknown and even if it could be estimated would be unlikely to result in a simple analytical form. The remaining description will utilize the signal processing terminology rather than the computer science terminology. That is, subband, packet, energy and packet energy will replace task, processor, time and makespan, respectively.

The invention provides an energy equalization algorithm for distributing k subbands to n packets such that the packets have approximately equal energy, and the largest difference in packet energies is bounded from above by the largest difference of subband energies after the subbands are sorted in nondecreasing order of their energies, regardless of the subband energy distribution function.

FIG. 2 is a flow diagram of an exemplary embodiment of the energy equalization algorithm as applied to a case in which the number of packets n is two and the number of subbands k is 2 m. In this algorithm, subbands are sorted in nondecreasing order of their energies and then consecutive subbands are paired from the one with the largest energy to the one with the smallest, where each subband pair is disjoint. The pairs of subbands are then sorted in nondecreasing order of their differences in energies. Pairs of subbands are then assigned to the two packets such that the subband with the larger energy in a given pair is assigned to the packet with less cumulative energy and the subband with the smaller energy in the pair is assigned to the other packet. This process is illustrated in greater detail in FIG. 2.

In step 30 of FIG. 2, the subband energies $\sigma_i$ are sorted in nondecreasing order:

$$\sigma_1 \geq \sigma_2 \geq \ldots \geq \sigma_k.$$

It is assumed that k=2 m. If k is odd, a dummy subband $\sigma_{k+1}$ could be added with energy equal to zero. In step 32, pairs of subband energies are formed from the largest to the smallest. Each pair of subband energies includes a couplet $\{\sigma_{2i-1}, \sigma_{2i}\}$, where i=1, 2, ... m. Step 34 defines $\delta_{\Omega i}$ as the difference $\sigma_{2i-1}-\sigma_{2i}$, where i=1, 2, ... m, and then sorts the $\delta_{\Omega i}$ in nondecreasing order such that j is the index of the jth largest $\delta_{\Omega i}$:

$$\delta_1 \geq \delta_2 \geq \ldots \geq \delta_m. \quad (4)$$

In step 36, for i=1, 2, ... m, the subband energies $\{\sigma_{2i-1}, \sigma_{2i}\}$ are assigned to the two packets. The subband energy $\sigma_{2i-1}$ is assigned to the packet with the smaller cumulative energy and the subband energy $\sigma_{2i}$ is assigned to the other packet.

Figure 3A:
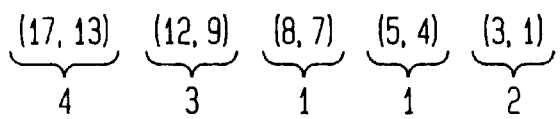
FIGS. 3A and 3B illustrate ordering of subband energy pairs in an example of the operation of the energy equalization algorithm of FIG. 2.
Figure 3B:
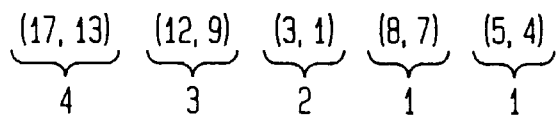

As an example of the operation of the energy equalization algorithm of FIG. 2, assume that there are k=10 subbands with subband energies $\sigma_i$ given by {12, 8, 5, 4, 1, 17, 13, 3, 9, 7}. In accordance with steps 30 and 32 of FIG. 2, these subband energies are sorted in nondecreasing order and then paired to produce the pairings shown in FIG. 3A. The number below each pair corresponds to the difference $\delta_{\Omega i}$ between the two subband energies of that pair. In accordance with step 34, the pairs are sorted in nondecreasing order of their differences, resulting in the ordering shown in FIG. 3B. Finally, the subband energies are distributed to the two packets as per step 36, each time assigning the larger energy from the pair to the packet with smaller cumulative energy. The resulting assignment of subbands to packets is shown in TABLE 1 below. The cumulative energies for the two packets in this example are designated $E^1$ and $E^2$, respectively. It can be seen from TABLE 1 that the energy equalization algorithm produces an approximately equal cumulative energy for each of the two packets.

TABLE 1

| | Subband-to-Packet Assignments | | | |
|---|---|---|---|---|
| Iteration | Packet 1 | $E^1$ | Packet 2 | $E^2$ |
| 1 | 17 | 17 | 13 | 13 |
| 2 | 9 | 26 | 12 | 25 |
| 3 | 1 | 27 | 3 | 28 |
| 4 | 8 | 35 | 7 | 35 |
| 5 | 5 | 40 | 4 | 39 |

It will now be shown that the largest difference in cumulative packet energies is bounded by the largest difference in subband energies after the subbands are sorted in nondecreasing order of their energies. The total energy of all subbands is denoted by E and the cumulative packet energies for the two packets by $E^1$ and $E^2$. The energy difference between the two packets is bounded from above by the largest energy difference $67_1$, that is, $|E^2-E^1| \leq \delta_1$. Let $E^1_{i-1}$ and $E^2_{i-1}$ denote the cumulative energies in the two packets before the ith pair of subbands with energies $\{\sigma_i^1, \sigma_i^2\}$ is assigned. It will be assumed without loss of generality that $E^1_{i-1} \leq E^2_{i-1}$ and $\sigma_i^1 \leq \sigma_i^2$, such that $\sigma_i^2$ is assigned to the first packet and $\sigma_i^1$ to the second packet. Let $d_{i-1}=E^2_{i-1}-E^1_{i-1}$ and $\delta_i=\sigma_i^2-\sigma_i^1$. Assume that $d_0=E^2_0-E^1_0$. It then follows that:

$$|d_i| = |E_i^2 - E_i^1| \quad (5)$$
$$= |(E_{i-1}^2 + \sigma_i^2) - (E_{i-1}^1 + \sigma_i^2)|$$
$$= |(E_{i-1}^2 - E_{i-1}^1) - (\sigma_i^2 - \sigma_i^1)|$$
$$= |d_{i-1} - \delta_i|.$$

It can be shown by induction that $$|d_m| \leq \delta_1, \quad (6)$$

that is, the energy difference between the two packets can be no greater than the largest subband energy difference of the subband pairs. By definition, $|d_1|=|E^2_1-E^1_1|=|\delta_1|$. Therefore, (6) is true for m=1. Now, assume that it is also true for m=i, that is, $$|d_i| \leq \delta_1. \quad (7)$$

Using (5), it can be seen that $d_{i+1}=|d_i-\delta_{i+1}|$. Since $d_i$ must have the same sign as $\delta_{i+1}$, $|d_{i+1}|=|d_i-\delta_{i+1}| \leq |d_i| \leq \delta_1$. Therefore, (6) is also true for m=i+1, and by induction (6) is true for all m.

The process of determining the minimum number of subbands k needed to provide a given maximum cumulative packet energy difference E will now be described. For the above-described two packet case, a lower bound on the number of subbands needed for a given E can be determined. Consider an input signal applied to an orthogonal filter bank. Assume that the analysis filters are nonoverlapping in frequency such that the subband signals are also nonoverlapping in frequency. Assume that the input signal magnitude-frequency response has a maximum magnitude of M and the bandwidth of each subband is $B_w$, where $B_w \leq \epsilon/M$. Then the energy of each subband is less than or equal to $\epsilon$. Thus, the energy difference of each subband pair is less than or equal to $\epsilon$. Then, in accordance with (4), $$\epsilon \geq \delta_1 \geq \delta_2 \geq \ldots \geq \delta_m.$$

By the same argument presented in conjunction with (5) through (7) above, $|d_m| \leq \delta_1 \leq \epsilon$. From the foregoing, it can be seen that $B_w \leq \epsilon/M$ is a sufficient condition for $|d_m| \leq \epsilon$. Given $B_w$, the number of subbands k can be determined as:

$$k \geq \pi \frac{M}{\epsilon},$$

since $B_w = \pi/k$. Therefore, given a maximum energy difference which can be tolerated, the minimum number of subbands required to achieve that can be determined. It should be noted that such a result may not be determinable in a general, n-packet case.

FIG. 4 shows an image transmission system 40 in accordance with an alternative embodiment of the invention. This embodiment of the invention exhibits reduced overhead relative to the system 10 previously described. The system 40 includes a scrambler 42, a DC subtractor 44 and an analysis filter bank 46. The transmitted packets pass through a lossy network 48 and are then applied to receiving end including a synthesis filter bank 50, a DC addition device 52 and an unscrambler 54. The original input image is applied to the scrambler 42. The scrambler 42 maps each pixel in the image into a different spatial position deterministically so that the unscrambler 54 in the receiving end can unscramble the scrambled image. The purpose of the scrambler 42 is to whiten the input image such that each subband of the resulting output image has approximately the same energy. As a result, the above-described energy equalization algorithm need not be used. Also, since all the subbands at the output of the scrambler 42 have approximately the same energy, the subbands can be distributed into packets deterministically. Therefore, instead of labeling each subband within a packet as in system 10 of FIG. 1, the system 40 need only label each packet. A label is thus sent with each packet so that the unscrambler 54 in the receiving end can reassemble the subbands into a reconstructed image.

Since the energy of each subband is approximately the same except for the overall brightness as indicated by the DC band, the scrambled images of certain image classes will tend to look visually similar. More particularly, the DC bands of the scrambled images of a given image class can be used interchangeably if the overall brightness is known. Therefore, unlike the system 10 of FIG. 1, in the system 40 only the overall brightness, rather than the entire DC band, is combined with each of the subbands. This further reduces the overhead associated with the image transmission process. At the receiving end, the subbands of each received packet are applied to the synthesis filter bank 50. The output of the synthesis filter bank 20 is then added to a pre-set scrambled low-pass image in the DC addition device 52. The DC addition device 52 scales the pre-set scrambled low-pass image by the overall brightness of the original image, as sent in each of the packets. Finally, the received scrambled image is unscrambled in unscrambler 54 to provide the reconstructed image. The overhead associated with the brightness information and packet labeling in the system 40 of FIG. 4 is given by:

$$r_2 = 1 + \frac{2n}{hw},$$

where h, w are the height and width of the image, respectively. The image transmission technique implemented in the system 40 of FIG. 4 therefore generally requires less overhead than that of the system 10 in FIG. 1.

A number of experiments were performed applying the above-described image transmission techniques to a number of different images including exemplary natural images, cartoon images, computer-generated checkerboard images and text images. The analysis and synthesis filter banks used in each case had 64 subbands divided into 8 packets, with each packet of size 32 Kbits. It was found that for each of the different types of images, both the FIG. 1 embodiment and the FIG. 4 embodiment provided graceful degradation in image quality in the presence of packet loss. The FIG. 1 embodiment generally provides a better reconstructed image quality at low packet loss than the FIG. 4 embodiment, but at the cost of higher overhead. As packet loss increases, the dominant image degradation artifact in the FIG. 1 embodiment is blurring, while in the FIG. 4 embodiment the dominant artifact is shot noise. Selection of the FIG. 1 or FIG. 4 embodiment may thus involve a tradeoff between factors such as reconstructed image quality, preferred type of degradation artifact and overhead.

The above-described embodiments of the invention are intended to be illustrative only. Alternative embodiments of the invention may utilize other types of energy equalization algorithms, as well as other techniques for distributing image data to packets such that the energy is approximately constant across the packets. One possible alternative approach may involve placing a copy of the most important block of data, such as the data block corresponding to a low-pass filtered version of the image, into each packet. The receiver can therefore reconstruct the image since the most important information is in every packet and is thus assured of getting through. Moreover, the invention may be used for a wide variety of different types of raw and compressed image data. For example, an image compressed in accordance with the well-known JPEG standard may be transmitted by placing the DC component of a discrete cosine transform (DCT) of the compressed image into each packet.

These and numerous other alternative embodiments within the scope of the following claims will be apparent to those skilled in the art.

What is claimed is:

1. A method of transmitting a signal over a network, comprising the steps of:

assigning portions of the signal to packets; and transmitting the packets over the network to a receiver, wherein the assigning step includes assigning portions of the signal to the packets such that reconstructed signal quality at the receiver, for a given amount of packet loss in transmission, is substantially uniform regardless of which of the packets are lost.

2. The method of claim 1 wherein the signal is a compressed or uncompressed image signal.

3. The method of claim 1 wherein the signal is a compressed or uncompressed video signal.

4. The method of claim 1 wherein the signal is a compressed or uncompressed audio signal.

5. The method of claim 1 wherein the signal is a compressed or uncompressed speech signal.

6. The method of claim 1 wherein the reconstructed signal quality is substantially uniform in that reconstruction error between the signal itself and a reconstructed signal generated from a group of a given number of the packets is substantially uniform regardless of which of the packets are in the group.

7. The method of claim 1 wherein the step of assigning portions of the signal to packets further includes the steps of:

separating the signal into a plurality of subbands; and assigning the subbands to the packets in accordance with an energy equalization algorithm such that the cumulative signal energies of the packets are approximately equal.

8. The method of claim 7 wherein the step of separating the signal into a plurality of subbands includes the step of applying at least a portion of the signal to a cosine-modulated orthonormal analysis filter bank.

9. The method of claim 7 wherein the energy equalization algorithm includes the steps of:

sorting energies of the subbands in nondecreasing order;

forming pairs of the subband energies in an order from largest to smallest;

sorting differences between the subband energies of the pairs in nondecreasing order; and assigning the subband energies to different packets such that the larger subband energy of a given pair of subband energies is assigned to a packet having a lower cumulative energy than another packet to which the smaller subband energy of the given pair is assigned.

10. The method of claim 7 further including the steps of:

separating a DC band of the signal from the remainder of the signal; and inserting the DC band into each of the packets.

11. The method of claim 7 further including the step of including in a given packet one or more labels identifying each of the subbands in that packet.

12. The method of claim 1 wherein the step of assigning portions of the signal to packets further includes the steps of:

whitening the signal to produce a whitened signal;

separating the whitened signal into a plurality of subbands; and assigning the subbands to the packets deterministically.

13. The method of claim 12 further including the step of including in a given packet a label identifying which portion of the whitened signal is contained within that packet.

14. The method of claim 12 wherein the signal is an image and the step of whitening the signal includes scrambling the image such that pixels in the image are mapped to different spatial positions to thereby produce a whitened scrambled image.

15. The method of claim 14 further including the steps of:

separating a DC band of the scrambled image from the remainder of the image; and inserting an overall brightness indicator from the DC band into each of the packets.

16. The method of claim 15 further including the steps of:

using the overall brightness indicator to scale a pre-set scrambled low-pass image in the receiver; and adding the scaled pre-set scrambled low-pass image to an output of a synthesis filter bank which recombines the subbands of the scrambled image.

17. An apparatus for transmitting a signal over a network, the apparatus comprising:

a filter bank associated with a transmitter, the filter bank separating the signal into a plurality of portions for assignment to packets for transmission over the network to a receiver;

wherein the transmitter is operative to assign the portions of the signal to the packets such that reconstructed signal quality at the receiver, for a given amount of packet loss in transmission, is substantially uniform regardless of which of the packets are lost.

18. The apparatus of claim 17 wherein the filter bank is operative to separate a compressed or uncompressed image signal into a plurality of portions for assignment to the packets.

19. The apparatus of claim 17 wherein the filter bank is operative to separate a compressed or uncompressed video signal into a plurality of portions for assignment to the packets.

20. The apparatus of claim 17 wherein the filter bank is operative to separate a compressed or uncompressed audio signal into a plurality of portions for assignment to the packets.

21. The apparatus of claim 17 wherein the filter bank is operative to separate a compressed or uncompressed speech signal into a plurality of portions for assignment to the packets.

22. The apparatus of claim 17 wherein the reconstructed signal quality is substantially uniform in that reconstruction error between the signal itself and a reconstructed signal generated from a group of a given number of the packets is substantially uniform regardless of which of the packets are in the group.

23. The apparatus of claim 17 wherein the filter bank is a cosine-modulated orthonormal analysis filter bank.

24. The apparatus of claim 17 wherein the filter bank separates the signal into a plurality of subbands for assignment to the packets.

25. The apparatus of claim 24 wherein the transmitter includes an energy equalization device which assigns the subbands of the signal to packets for transmission over the network to the receiver, such that the cumulative signal energies of the packets are approximately equal.

26. The apparatus of claim 25 wherein the energy equalization device is further operative to sort energies of the subbands in nondecreasing order, to form pairs of the subband energies in an order from largest to smallest, to sort differences between the subband energies of the pairs in nondecreasing order, and to assign the subband energies to different packets such that the larger subband energy of a given pair of subband energies is assigned to a packet having a lower cumulative energy than another packet to which the smaller subband energy of the given pair is assigned.

27. The apparatus of claim 25 wherein the transmitter further includes a DC subtractor for separating a DC band of the signal from the remainder of the signal, and the energy equalization device is further operative to insert the DC band into each of the packets.

28. The apparatus of claim 25 wherein the energy equalization device is further operative to include in a given packet one or more labels identifying each of the subbands in that packet.

29. The apparatus of claim 17 wherein the transmitter is further operative to whiten the signal, such that the filter bank separates the whitened signal into a plurality of subbands, and the subbands are assigned to the packets deterministically.

30. The apparatus of claim 29 wherein the transmitter is further operative to include in a given packet a label identifying which portion of the whitened signal is contained within that packet.

31. The apparatus of claim 29 wherein the signal is an image and the transmitter is operative to whiten the signal by scrambling the image such that pixels in the image are mapped to different spatial positions to thereby produce a whitened scrambled image.

32. The apparatus of claim 31 wherein the transmitter further includes a DC subtractor for separating a DC band of the scrambled image from the remainder of the scrambled image, wherein an overall brightness indicator derived from the DC band is inserted into each of the packets.

33. The apparatus of claim 32 wherein the overall brightness indicator is used to scale a pre-set scrambled low-pass image in the receiver, and the scaled pre-set scrambled low-pass image is added to an output of a synthesis filter bank which recombines the subbands of the scrambled image.

* * * * *